Oct. 2, 1945.　　　S. A. WINKELMANN　　　2,385,903
WATER TREATMENT
Filed July 1, 1942
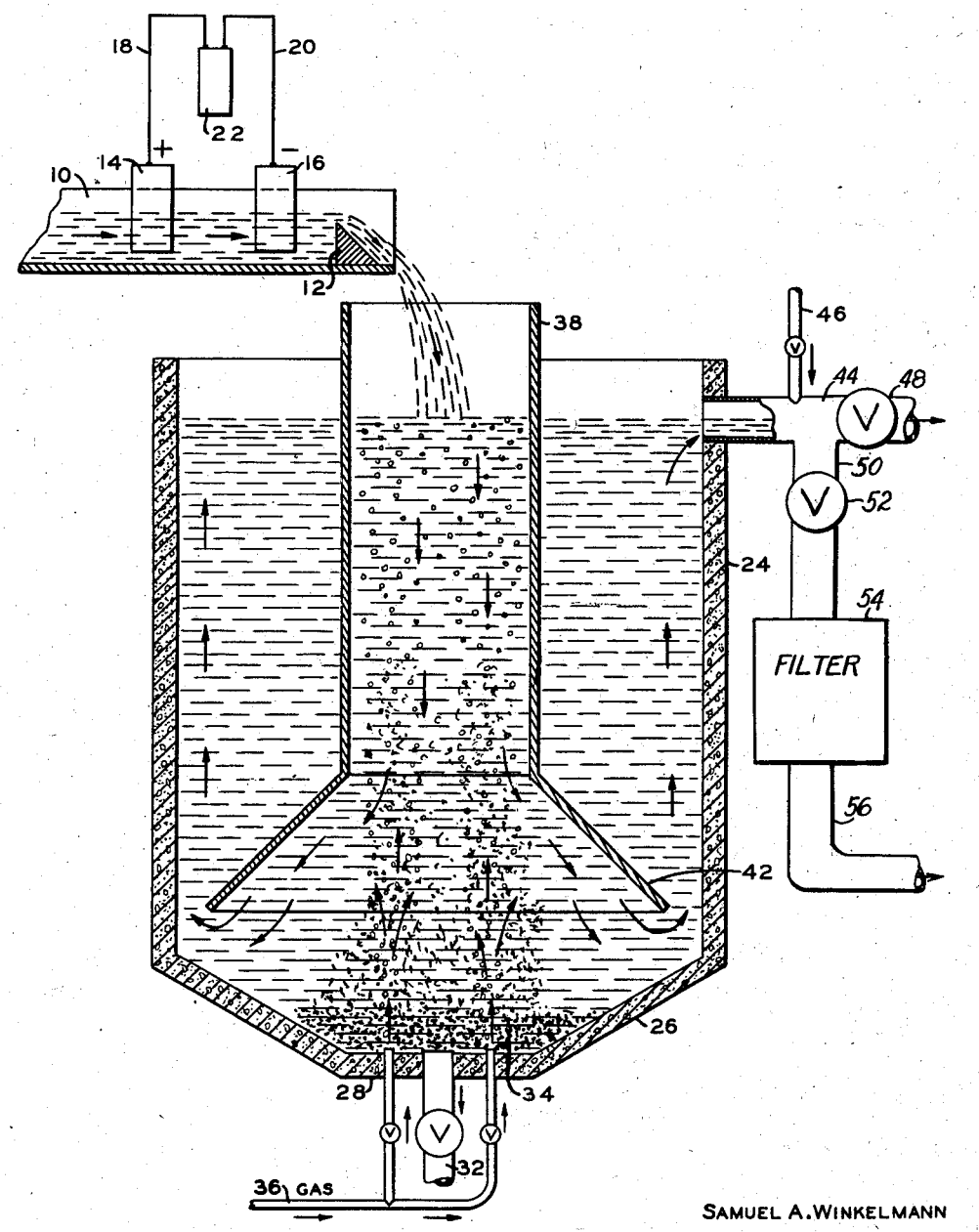
SAMUEL A. WINKELMANN
INVENTOR Patented Oct. 2, 1945

2,385,903

UNITED STATES PATENT OFFICE 2,385,903

WATER TREATMENT

Samuel A. Winkelmann, West Columbia, Tex., assignor to The Texas Company, New York, N. Y., a corporation of Delaware Application July 1, 1942, Serial No. 449,216

2 Claims. (Cl. 210—16)

This invention relates to a process for preparing for disposal waste waters containing alkali metal chlorides, alkaline earth salts, iron salts, and bacteria. The invention especially relates to a process for preparing saline oil field waters for disposal. Such waters contain sodium chloride, calcium salts, iron salts and bacteria, and they are usually disposed of by being injected into a well leading into an underground formation.

In the production of many oil fields a substantial amount of water is obtained along with the oil, and it is necessary to provide means for disposing of this water. It is common practice to return the water to an underground formation, which may be the same formation from which production is being accomplished. In any case, it is important that the water should be in such condition as not to cause plugging of the producing sands. Such plugging will not only make difficult the disposal of additional water, but will also adversely affect the production of oil from the sands in question.

Various processes have been employed in the treatment of these oil field waters. Since the water in the formation is usually under an elevated pressure, the reduction in pressure effected when the water is discharged into the usual settling pits, causes the water to give up carbon dioxide, which upsets the balance between the bicarbonates and carbonates present and causes precipitation of the insoluble carbonates. Also, due to the increased pH caused by the release of carbon dioxide, some precipitation of iron hydroxides is accomplished. However, this precipitation of iron hydroxides is not instantaneous or complete, so that the water is not adapted for introduction into producing sands.

It has previously been proposed to aerate the water thoroughly so as to release carbon dioxide and oxidize the iron compounds, and then to add chemicals to precipitate the unstable carbonates and bicarbonates. After the chemical treatment, the water has been filtered and chlorine has been added to kill any bacteria which might cause release of sulfur from sulfates present in the water. This prior process and other similar processes have the disadvantage that they require the use of important amounts of chemicals.

In accordance with the invention I have discovered that waste waters of the type of oil field waters may be efficiently prepared for disposal by proceeding as described below. The process comprises subjecting the water to electrolysis to release chlorine at the anode and form alkali metal hydroxide and hydrogen at the cathode, thereafter bringing the water into intimate contact with added crystals of an alkaline earth carbonate, preferably calcium carbonate, settling in a quiescent zone, and filtering. Before filtering, or at any rate before disposing of the water, the water is preferably treated with a calcium sequestering agent to insure that no later precipitation of calcium salts occurs.

The electrolysis treatment has been found to accomplish several advantageous results when combined with the other steps of the process. The chlorine released at the anode does not escape from the solution but apparently combines with alkali metal hydroxides therein to form hypochlorites which act to kill bacteria. The alkali metal hydroxide formed due to the reaction of released alkali metal at the cathode, is effective to raise the pH of the solution until an alkaline solution is obtained. In this solution the iron compounds are largely converted to hydroxides, and alkaline earth bicarbonates, such as calcium bicarbonate, are converted to carbonates. Under these conditions the solution is normally supersaturated with calcium carbonate. I have found that this supersaturation may be reduced by agitating the solution with calcium carbonate crystals. Such agitation also aids in removing iron hydroxides.

The agitation is preferably accomplished by passing a gas through the solution; i. e., aerating the solution, and the calcium carbonate crystals may be crystals obtained from the prior treatment of waste water or they may be added crystals obtained from any suitable source. It is preferred to use air or other oxygen-containing gas in the aeration since in this way the ferrous compounds present are largely converted to ferric compounds which are more easily removed from the solution.

In order that the invention may be understood more fully reference should be had to the accompanying drawing which is a diagrammatic elevation, partly in section, of a simple form of apparatus which may be employed in carrying out the present process.

In the drawing, the single figure is a sectional elevation of this invention wherein the process of this invention can be performed.

Referring to the drawing, the oil field water from a collection system not shown enters through a conduit 10, which may be a pipe or open flume. Disposed in the conduit is a weir 12, which serves to keep the water at a selected minimum level. Extending below the level of the water are an anode 14 and a cathode 16, which are connected by wires 18 and 20 to any suitable source of electricity, such as a battery or generator, represented generally at 22. The anode may be constructed of any suitable inactive material such as carbon, for example, while the cathode may be composed of a similar material or may be composed of a metal such as iron.

The water in the conduit is subjected to the electrolytic action which produces two principal results. Sodium chloride in the water is decomposed to form sodium hydroxide and sodium hypochlorite. It will be understood that the specific manner of carrying out the electrolysis will be largely dependent upon the specific character of the water treated, the type of electrodes used, the size of the conduit, and rate of flow of water. In one test it was demonstrated that with a current of 12 amperes the desired reaction would take place in 2,000 barrels of water in the period of one day. Thus, hypochlorous acid, as sodium hypochlorite, was present in amount corresponding to about 0.5 part per million, which is above the minimum for killing bacteria. Also the amount of sodium hydroxide present in the water was increased so that the water was rendered definitely alkaline (pH above 7, about 7.3), which caused a conversion of bicarbonates to carbonates and also a conversion of a substantial proportion of the iron compounds to iron hydroxides.

After being subjected to the electrolytic treatment the water is introduced into a tank or settling vessel 24. As shown, this vessel is constructed with an inclined bottom 26 having a horizontal central section 28. A pipe 32 is disposed in the horizontal section for removing accumulated solids from the vessel. A plurality of nozzles 34 are also disposed in the horizontal section for the purpose of injecting gas into the tank, the gas being led to the nozzles through line 36. The vessel is divided into two sections by a centrally disposed cylindrical member 38 having a frusto-conical bottom portion 42. An exit pipe 44 leads from the side of the vessel for the purpose of conducting the treated water therefrom. A valved pipe 46 leads into pipe 44 and is employed as described below.

The water leaving the vessel is preferably filtered and to accomplish this a valve 48 is provided in pipe 44 which is closed so as to cause the water to flow into a pipe 50 controlled by a valve 52 which is open when the water is to be filtered. Pipe 50 leads to any suitable type of filter which is represented generally at 54, and the filtered water is conducted from the system through pipe 56.

Returning to the description of the process, the water flows out of the conduit 10 and into the top of the cylindrical member 38. A suitable gas, preferably air, is introduced into the tank through nozzles 34 and is confined to the cylindrical center section. The gas accomplishes agitation of the water and keeps calcium carbonate crystals in intimate contact with the water. When the system is started into operation, calcium carbonate crystals from an extraneous source will ordinarily be introduced into the water to assist in accomplishing precipitation; however, after the reaction has gone on for some time calcium carbonate crystals will be continuously separating from the water, falling down into the horizontal central section of the tank, and will be forced upwardly by the action of the gas jets. The agitation is also effective to improve the precipitation of iron hydroxides from the water. Moreover, when air is used as the gas, substantial oxidation of the ferrous compounds to the more easily removed ferric compounds is accomplished. The water, after passing downwardly through the cylindrical member, passes into the outer section of the tank where quiescent conditions obtain and settling is substantially completed. The water passes from the tank 24 through pipes 44 and 50 which lead to filter 54, which is preferably a sand filter.

The operation accomplished in the tank 24 will usually effect substantially complete carbonate stabilization of the water so that little additional precipitation of calcium salts from the water is possible. However, in order to avoid any additional precipitation of this character, it is preferred to introduce into the solution passing through pipe 44 a calcium sequestering agent which is preferably a phosphate, especially sodium hexametaphosphate. This agent may be introduced through line 46 in the form of an aqueous solution. Only a small amount of phosphate is required for this purpose, the specific amount being dependent upon the alkaline earth content of the water subjected to treatment and the efficiency of the prior settling steps.

After passing through the filter, the water will be substantially free from a tendency to precipitate insoluble salts and will be sterile, so that it may be introduced into an injection well without plugging the sands.

Obviously many modifications and variations of the invention as hereinbefore described may be made without departing from the spirit and scope thereof, and therefore only such limitations should be imposed as are indicated in the appended claims.

I claim:

1. The process of purifying waste water containing sodium chloride, calcium carbonate, calcium bicarbonate, iron salts, and bacteria, which comprises subjecting the waste water to electrolysis to render the water alkaline and form sodium hypochlorite, whereby calcium bicarbonate is converted to calcium carbonate, iron salts are converted to hydroxides, and bacteria are killed, agitating the alkaline water with finely-divided, solid calcium carbonate to increase the precipitation of calcium carbonate and facilitate separation of other insoluble materials, settling the water to permit deposition of insoluble materials, treating the water substantially free from insoluble materials with a calcium sequestering agent, and filtering the treated water.

2. The process of continuously preparing oil field waste water for disposal, said water containing sodium chloride, calcium carbonate, calcium bicarbonate, iron salts and bacteria, which comprises subjecting a flowing stream of the oil field waste water to electrolysis to render the water alkaline and form sodium hypochlorite, whereby calcium bicarbonate is converted to calcium carbonate, iron salts are converted to hydroxides, and bacteria are killed, passing the flowing stream after the electrolysis downwardly in contact with rising jets of air carrying finely-divided, solid calcium carbonate previously precipitated from the flowing stream of water, to reduce the calcium carbonate supersaturation of the water and to facilitate separation of other insoluble materials, passing the flowing stream upwardly through a zone maintained under quiescent conditions to accomplish settling of insoluble materials, treating the flowing stream with a calcium sequestering agent, and thereafter filtering the flowing stream of water.

SAMUEL A. WINKELMANN.